W. B. HICKEY.
COTTON STALK CUTTER.
APPLICATION FILED MAR. 21, 1914.

1,129,675.

Patented Feb. 23, 1915.

Witnesses
L. Cloud Newman.
G. B. Reid.

Inventor
W. B. Hickey
By Robert Cobb
Attorneys

UNITED STATES PATENT OFFICE.

WILLIAM B. HICKEY, OF SAPULPA, OKLAHOMA.

COTTON-STALK CUTTER.

1,129,675.   Specification of Letters Patent.   Patented Feb. 23, 1915.

Application filed March 21, 1914. Serial No. 826,406.

*To all whom it may concern:*

Be it known that I, WILLIAM B. HICKEY, a citizen of the United States, residing at Sapulpa, in the country of Creek and State of Oklahoma, have invented certain new and useful Improvements in Cotton-Stalk Cutters, of which the following is a specification.

The present invention relates to improvements in agricultural implements and particularly to that class known as cotton stalk cutters.

The object in view is to provide a simple implement of this character embodying manually adjustable cutting blades that may readily be operated to permit of cutting the stalks at different heights, as well as for the purpose of clearing obstacles, locking means being employed for maintaining the blades in adjusted positions and which means are disposed for convenient operation by the foot of the operator.

It is comprehended in addition to the foregoing to provide means for holding the cutter device against laterally shifting during operation of the machine, due to contact of a blade at one side thereof without a counterbalancing contact at the other side.

These and such other objects as may hereinafter appear are attained by the novel construction, combination and arrangement of parts to be hereinafter specifically described and claimed.

Figure 1:
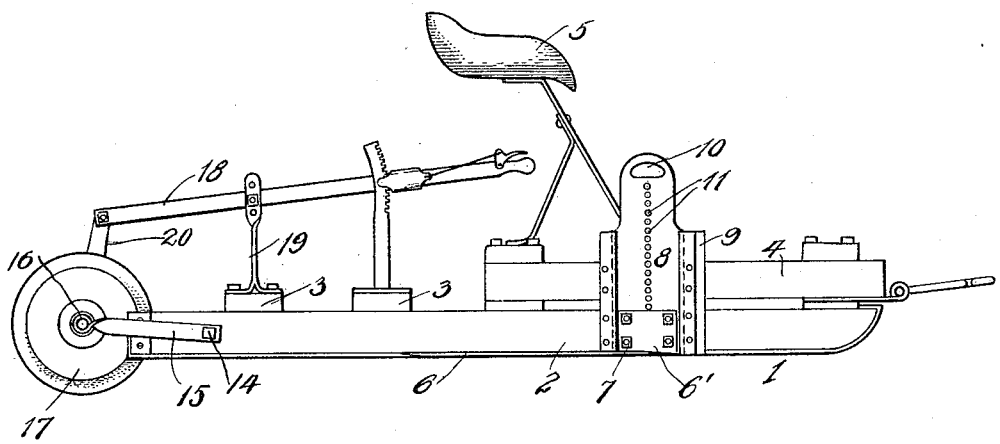
Figure 2:
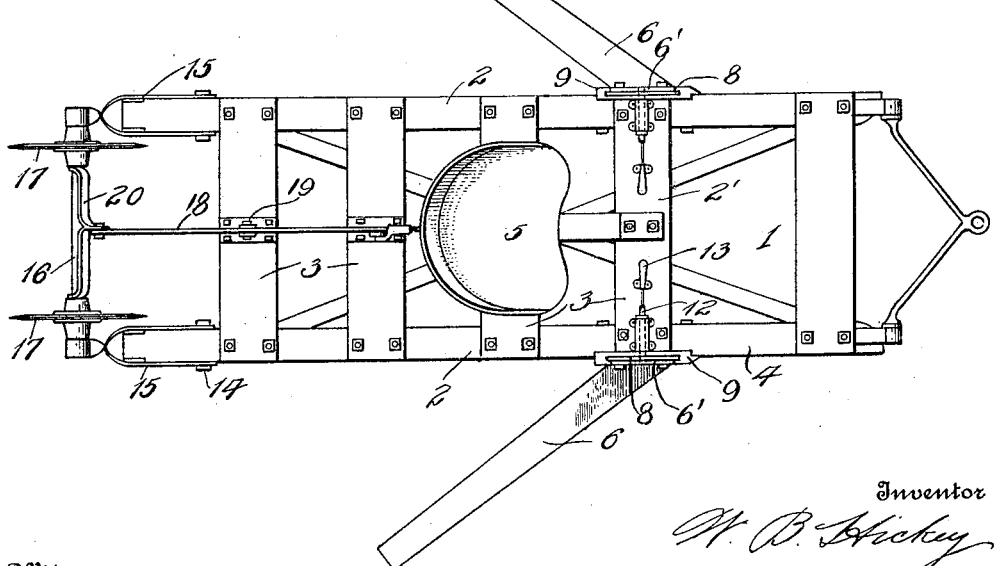

Reference will now be had to the drawing forming a part of this specification, wherein, Figure 1 is a side elevation of a machine forming an embodiment of my invention. Fig. 2 is a top plan view of the same.

Throughout the following detail description, and on the several figures of the drawings, similar parts are referred to by like reference characters.

Referring to the drawing, the numeral 1 designates a frame in the form of a sled or skid, comprising the side runners 2 and a plurality of cross pieces 3, an auxiliary frame 4, being disposed upon the main frame at the forward portion of the machine. Upon this auxiliary frame is a seat 5 and at opposite sides of said frame are located cutting blades 6, suitably inclined rearwardly and projecting laterally from the frame so as to afford a proper cutting action when in operation. The inner extremity of each blade is bent upwardly, as indicated at 6', and secured by means of bolts or other fastening members 7 to vertically slidable plates 8 mounted in flanged guide plates 9. As shown in Fig. 1 these plates 8 have a hand grip 10 at their upper extremities while a series of openings 11 formed in a vertically extending row centrally of each are provided in which sliding bolts 12 are received for holding the respective blades at any desired adjustment. A foot lever 13 is provided for each bolt 12 and disposed along with the supporting socket for the bolts on a cross piece 2' of the auxiliary frame 4 at a convenient place for the operator's foot when he is seated upon the seat 5.

Pivotally connected to the rear extremity of each runner 2 at 14 in the supporting arms 15 and upon a common shaft 16 are a pair of spaced disks 17 which are designed to hold the implement from slipping sidewise during the cutting operation, as when one of the blades strikes a stalk at one side without its opposing blade contacting simultaneously at the other side, thus tending to maintain a steady movement of the device. A lever 18 adjustably fulcrumed on the upright standard 19 is connected at one end to the shaft 16 through the instrumentality of the yoke 20 and affords ample means for adjusting the disks to regulate their depth of action, depending upon various conditions which would require more or less penetration of these elements into the earth to insure proper rigidity with respect to lateral movement of such devices as comprehended by the foreging description.

The operation of the device will be obvious to those skilled in this art by reference to the description above and the figures of the drawing and it will be readily understood that as the machine is dragged between the rows of stalks the blades 6 may be raised or lowered, independently of course, according to the height it is desired they should cut, by grasping the plates 8 and simultaneously releasing the locking bolts 12, by means of their respective foot levers. This arrangement greatly facilitates quick manipulation of a blade to permit the same to pass over a stump or other obstacle in its path.

Having thus described my invention what I claim as new is:—

1. A cotton stalk cutter comprising in combination, a frame, cutting blades carried thereby, manual operating means to which said blades are connected comprising vertically movable adjusting plates, and locking means for holding the blades at adjusted positions, consisting of spring actuated bolts movable in a horizontal plane into and out of engagement with the plates aforesaid, said bolts being adapted for foot actuation.

2. A cotton stalk cutter comprising in combination a frame adapted to be dragged between the rows of stalks, cutting blades disposed at each side of said frame and having their inner extremities bent upwardly, adjusting plates to which said blades are removably secured, said plates having manual gripping portions and a plurality of openings therein, a locking bolt for each of said plates adapted to engage in the openings of the same to hold the blades at predetermined adjustments, and foot levers operatively connected to said bolts for releasing the plates to permit of adjustment of the same.

In testimony whereof I affix my signature in presence of two witnesses.

WILLIAM B. HICKEY.

Witnesses:
 JOHN A. SPALDING,
 Mrs. JOHN G. ELLINGHAUSEN.